United States Patent [19]
Yusa et al.

[11] 3,922,150
[45] Nov. 25, 1975

[54] PROCESS AND APPARATUS FOR SEPARATING AND RECOVERING KRYPTON-85 FROM EXHAUST GAS OF NUCLEAR REACTOR OR THE LIKE

[75] Inventors: Hideo Yusa, Hitachi; Kunio Kamiya, Hitachi; Toshifumi Murata, Hitachi; Hideo Yamaki, Hitachi; Shigenobu Hisatomi, Kudamatsu, all of Japan

[73] Assignees: Hitachi, Ltd.; Power Reactor and Nuclear Fuel Development Corporation, both of Japan

[22] Filed: Feb. 26, 1973

[21] Appl. No.: 335,749

[30] Foreign Application Priority Data
Feb. 25, 1972  Japan.............................. 47-18928

[52] U.S. Cl............................... 55/25; 55/66; 55/74
[51] Int. Cl.............................................. B01d 53/00
[58] Field of Search.............. 55/28, 62, 66, 179, 74

[56]  References Cited
UNITED STATES PATENTS

| | | | |
|---|---|---|---|
| 3,063,217 | 11/1962 | Armond et al...................... | 55/66 X |
| 3,093,564 | 6/1963 | Weisman et al................... | 55/179 X |
| 3,680,288 | 8/1972 | Eluard............................... | 55/62 X |
| 3,703,797 | 11/1972 | Lepold et al........................... | 55/62 |

OTHER PUBLICATIONS

Cryogenic Rare Gas Recovery in Nuclear Fuel Reprocessing, Chemical Engineering, Vol. 78, No. 22, pp. 55-57.
Allied Chem. Corp. Report, ICP-1001, pp. 1-5.

*Primary Examiner*—Charles N. Hart
*Assistant Examiner*—Ferris H. Lander
*Attorney, Agent, or Firm*—Craig & Antonelli

[57]  ABSTRACT

An apparatus for separating and recovering radioactive krypton-85 contained in an exhaust gas of a nuclear reactor or the like, which comprises a plurality of adsorption beds connected in parallel with respect to a passageway for the exhaust gas, each being packed with activated carbon, wherein adsorption and desorption of krypton-85 in each of the beds are alternatively and repeatedly performed by operating valves disposed between each of the beds and means for reducing pressure in the beds to be desorbed in accordance with a predetermined time schedule.

The adsorption and concentration efficiencies are markedly increased by combining the above adsorption apparatus and a distillation apparatus.

28 Claims, 8 Drawing Figures

PROCESS AND APPARATUS FOR SEPARATING AND RECOVERING KRYPTON-85 FROM EXHAUST GAS OF NUCLEAR REACTOR OR THE LIKE

BACKGROUND OF THE INVENTION

1. Field of the Invention

The present invention relates to a process and apparatus for separating and recovering a radioactive noble gas, particularly krypton-85 with an increased efficiency from an exhaust gas of a nuclear reactor or the like, wherein krypton-85 is highly concentrated without interruption of the concentrating operation.

2. Description of the Prior Art

Various kinds of nuclear fission products are produced by atomic fission of nuclear fuel in a nuclear reactor. Many of them are radioactive isotopes. Among these the radioactive noble gases ($Xe^{133}$, $Xe^{135}$, $Kr^{85m}$, etc.) are non-condensable gases, and if a cladding tube of a fuel rod is broken, almost all of them shift into a gas phase since they are scarcely absorbed in a coolant. In a boiling water reactor (BWR), the radioactive noble gases brought into a gas discharging system are discharged directly into the atmosphere if the gas is not treated. This is apparently bad for the health of human beings and other living things. Also, in a fast breeder reactor (FBR) which is being developed today, the radioactive gases shift into a cover gas, so that a specific radioactivity of the cover gas is increased to deteriorate the safety of radiation shielding and of fixing and maintenance of the reactor and exchanging of fuel rods.

From the above reasons, there have been different measures to treating radioactive noble gases exhausted from a nuclear reactor. In BWR, for instance, a storing tank is disposed in a gas discharging system for reducing radiation activity of the gases, wherein the gases are compressedly stored in a delay tank or a pressure vessel for one day or more. Recently an apparatus for remarkably reducing the amount of the radioactive noble gases discharged into the atmosphere has been employed wherein the gases are stored in an adsorption column packed with activated carbon to hold them up for several days, e.g., 30 to 60 days. In FBR the activated carbon adsorption column will be employed to attenuate the radioactivity.

By holding-up of the radioactive noble gases for about 60 days, nuclides such as $Kr^{85m}$, $Xe^{135}$, etc. which are of a short half life attenuate within a short time, so that a discharge rate therefor can be made one thousandth that in case of one day holding-up. According to employment of the activated carbon adsorption column, it is possible to markedly reduce the amount of the radioactive noble gases discharged from the atomic power plants into the atmosphere.

With an increase in the number of nuclear reactors constructed and with planning of the construction of the reactors in the areas near urban developments, the discharging limit for the radioactive noble gases into the atmosphere will be inevitably restricted more severely. It is the severe problem in this case to treat krypton-85 which has a half life of about ten years and the effect of normally employed holding-up by the activated carbon adsorption column is not expected. Though in the above discussion the necessity of treatment of a krypton-85 containing exhaust gas has been described by reference to a nuclear reactor as an example, this problem is common to other nuclear plants such as fuel reprocessing facilitates for used fuel rods. The volume of an exhaust gas discharged from the fuel reprocessing facilitates is smaller than that of the reactor, but the content of krypton-85 therein is several ten ppm, while in the exhaust gases of BWR and FBR contents are about one ppm and ten ppm, respectively. Note that in the specification the krypton-85 concentration is the total krypton concentration in which both radioactive krypton-85 and non-radioactive kryptons-84 and 83 are contained. Since the restriction to the discharging of the radioactive noble gases from those facilitates is becoming severer year by year, the treatment of the krypton-85 containing gas is one of the most important problems.

As methods of treating krypton-85, there are methods such as:

1. absorption
2. adsorption
3. cryogenic distillation
4. gas-chromatography
5. separation using a perm-selective membrance
6. thermal diffusion and
7. clathrate.

Since these methods have been developed mainly for the purpose of separation of krypton-85 contained in the exhaust gas of the fuel reprocessing facilitate, they are not always useful for treating the exhaust gas of BWR or the cover gas of FBR in which the content of krypton-85 is small but the volume of gas is very large. In Table 1 there are shown problems of the respective known methods.

TABLE 1

Methods

1. Absorption:

Krypton-85 is subjected to absorption in a solvent such as liquified fleon, kerosene, etc. to separate it from the exhaust gas.

Disadvantages:
i. Small recovery ratio of $Kr^{85}$
ii. Intermixing of a solvent with an exhaust gas
iii. Deterioration of a solvent by the action of radioactive rays
iv. Operation under high pressure at very low temperature
v. Complicated apparatus and operation 2. Adsorption:

After krypton-85 is adsorbed in activated carbon at −170°C, krypton-85 is desorbed by heating the carbon at 100°C.

Disadvantages:
i. Low temperature operation
ii. Probability of explosion due to ozone attack
iii. Necessity for complete removal of impurity in the gas 3. Cryogenic distillation:

Krypton-85 is liquified together with a carrier gas, then krypton-85 is separated from the carrier gas by distillation.

Disadvantages:
i. Small recovery ratio
ii. Uneconomical
iii. Operation under high pressure at low temperature
iv. Complicated apparatus and operation 4. Gas-chromatography:

Krypton-85 is separated by a difference in adsorption in a low temperature activated carbon between krypton-85 and a carrier gas.

Disadvantages:
i. Small quantity of treating gas
ii. Batch operation

5. Membrane method:

Krypton-85 is separated from a carrier gas by a difference in permeability to a silicon membrance between krypton-85 and the carrier gas.

Disadvantages:
i. Large scale of apparatus
ii. Small recovery ratio
iii. High operating cost
iv. Complicated and difficult operation and maintenance
v. Breakage of membrance

SUMMARY OF THE INVENTION

It is an object of the present invention to provide a process and apparatus for separating and recovering krypton-85 from an exhaust gas of a nuclear reactor and the like, which is capable of separating krypton-85 continuously.

It is another object to provide a process and apparatus for separating krypton-85, which can completely separate and recover krypton-85 from an exhaust gas with a high efficiency.

It is still another object to provide a process and apparatus for separating and recovering krypton-85 with a high concentration so that storing of the concentrated gas containing krypton-85 becomes easy and economical.

The present invention provides a process and apparatus for separating and recovering krypton-85 from an exhaust gas of a nuclear facilitate, which comprises introducing the exhaust gas into a closed separating cycle comprising a plurality of adsorption beds packed will activated carbon wherein the adsorption beds are alternatively and repeatedly operated to adsorb krypton-85 in the activated carbon without interruption of adsorption operation. The present invention also provides an apparatus comprising an adsorption bed system and a cryogenic distillation system.

BRIEF DESCRIPTION OF THE DRAWINGS

The above objects and other objects and features and advantages of the present invention will be apparent from the following detailed description taken in conjunction with the accompanying drawings, wherein.

DETAILED DESCRIPTION OF THE INVENTION

Figure 1:
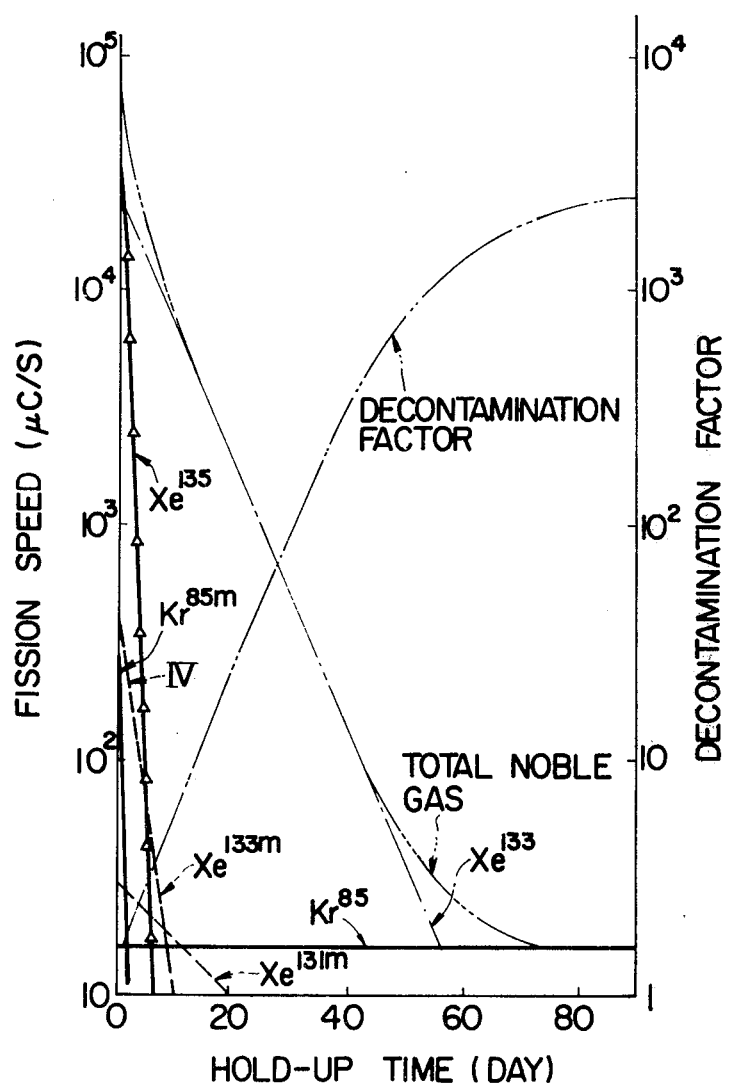
FIG. 1 shows the relationship between a hold-up time and discharging speed of radioactive noble gases.
Figure 2:
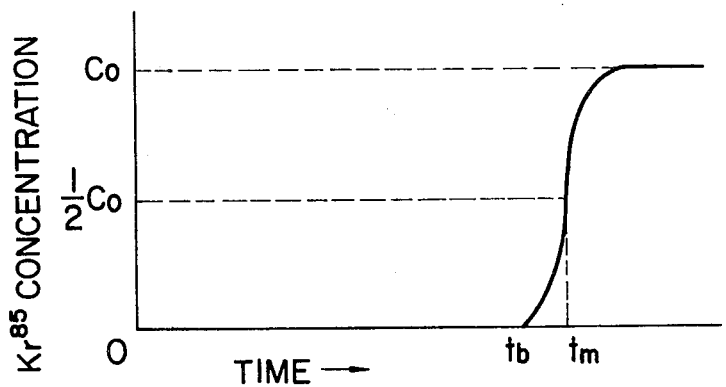
FIG. 2 shows a break through curve of the concentration of krypton-85 versus time.

As stated above, krypton-85 has an extremely long half life, as shown in FIG. 1. The values in the figure were obtained by the inventors' calculations. In FIG. 1, the decontamination factor is the effect of hold-up on decontamination of a desorbed gas, and is the ratio of a krypton-85 concentration at the inlet of the adsorption bed to that at the outlet. When a krypton-85 concentration of an exhaust gas at an outlet of an adsorption bed is determined, a break through curve of krypton-85 shown in FIG. 2 is obtained wherein Co is a krypton-85 concentration in the exhaust gas to be treated, $t_m$ represents a mean holding-up time of krypton-85, which varies with an operating condition, such as a quantity of activated carbon, a temperature, a pressure, a flow amount of exhaust gas, etc., and is expressed by the following equation:

$$t_m = \frac{KM}{F \frac{237+t}{237} \times \frac{1}{p}} \quad (1)$$

wherein $K$ is a dynamic adsorption equilibrium constant ($m^3$/ton) of krypton under a pressure ($p$ atm.) at a temperature ($t°C.$), M is an amount of activated carbon(ton), and $F$ is a gas flow rate ($m^3/h$).

$t_b$ is the time at which krypton-85 starts to flow out and is called the break through time and expressed as follows:

$$t_b = a.t_m \quad (a < 1) \quad (2)$$

wherein $a$ is a constant with respect to a mass transfer of krypton-85 which is varied with a grain size of activated carbon, a flow rate of the exhaust gas, etc.

Figure 3:
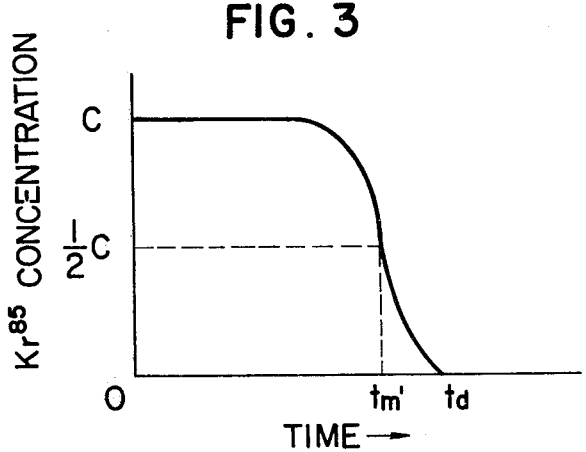
FIG. 3 shows a desorption curve of the concentration of krypton-85 versus time.

On the other hand, a desorption curve as shown in FIG. 3 is obtained when a gas is passed through an adsorption bed in which krypton-85 has been adsorbed, thereby desorbing krypton-85. In FIG. 3, C is the krypton-85 concentration at the outlet of the adsorption bed. $t_{m'}$ is a mean holding-up time of krypton-85 under the desorption condition and expressed as follows:

$$t_{m'} = \frac{K'M}{f \frac{273+t'}{273} \times \frac{1}{p'}} \quad (3)$$

wherein a desorption temperature is $t'°C$, a pressure is $p'$ atm., a dynamic adsorption equilibrium constant of krypton under the above conditions is $K'$ $m^3$/ton, anf $f$ is a desorption gas flow rate ($Nm^3/h$). $t_d$ is a desorption completion time and expressed by the following equation:

$$t_d = b.t_{m'} \quad (b > 1) \quad (4)$$

wherein $b$ is a constant with respect to a mass transfer of krypton-85.

In order for desorbing krypton-85 in an adsorption bed while adsorption is being effected in another bed, the condition $t_d < _b$ is essential, and by selecting the adsorption and desorption conditions which can satisfy the above condition a cyclic treatment for krypton-85 can be carried out in the adsorption apparatus.

When a desorbed gas discharged from the bed is mixed with an exhaust gas so as to treat the mixed gas with another adsorption bed, $t_b$ has to be computed in accordance with the following equation, rather than with the equation (1):

$$t_b = \frac{a(KM-V)}{(F+f) \frac{273+t}{273} \times \frac{1}{p}} \quad (5)$$

wherein $V$ is a volume of a carrier gas in an adsorption bed at a temperature of $t°C$ and a pressure of $p$ atm. and when activated carbon is packed in a bed in a closed-packed structure, $V$ can be substantially negligible, so that the equation (5) is modified as follows:

$$t_b = \frac{aKM}{(F+f)\frac{273+t}{273} \times \frac{1}{p}} \quad (6)$$

The condition for adsorption and desorption of krypton-85 will be explained in the following. From the condition $t_d < t_b$, the following equation (7) is derived.

$$\frac{bK'}{f\frac{273+t'}{273} \times \frac{1}{p'}} < \frac{aK}{(F+f)\frac{273+t'}{273} \times \frac{1}{p}} \quad (7)$$

Figure 4:
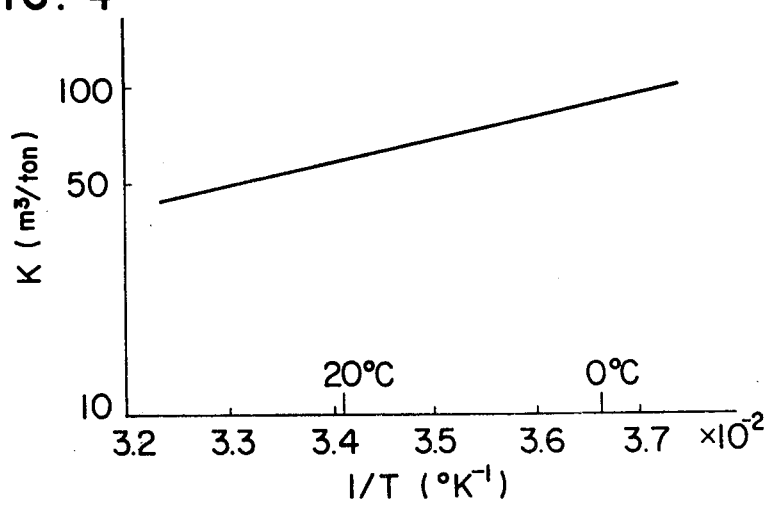
FIG. 4 shows an effect of temperature on the dynamic absorption constant K.
Figure 5:
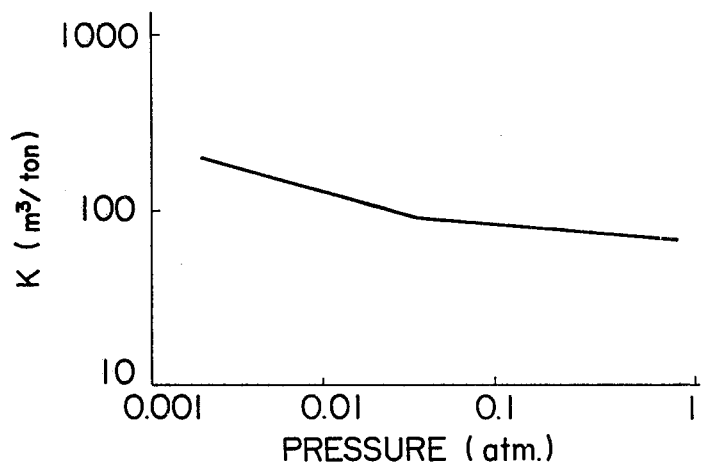
FIG. 5 shows an effect of pressure on the constant K.

In FIGS. 4 and 5, there is shown a dynamic adsorption equilibrium constant $K$ ($m^3$/ton) which is determined under the conditions of different temperatures and pressures. Since the higher the temperature, the smaller the value of $K$ becomes, as shown in FIG. 4, it is preferable that the temperature of the adsorption is higher than that at the adsorption (i.e., $t' > t$). On the other hand, the value of $K$ becomes large by lowering a pressure, as shown in FIG. 5, and the degree of its increment is not proportional to the pressure, but it makes greater the effect of reducing the pressure on enlarging the denominator in the above equation. Therefore, it is preferable to make the pressure at the desorption lower than that at the adsorption (i.e., $p' < p$). It has been found that constants $a$ and $b$ are dependent on a linear speed of a gas flow and a length of an activated carbon bed and that $a$ is 0.9 and $b$ is 1.1.

The process according to the present invention cannot be realized if krypton-85 adsorbed in an adsorption bed is not desorbed while krypton-85 is being adsorbed in another adsorption bed.

Figure 6:
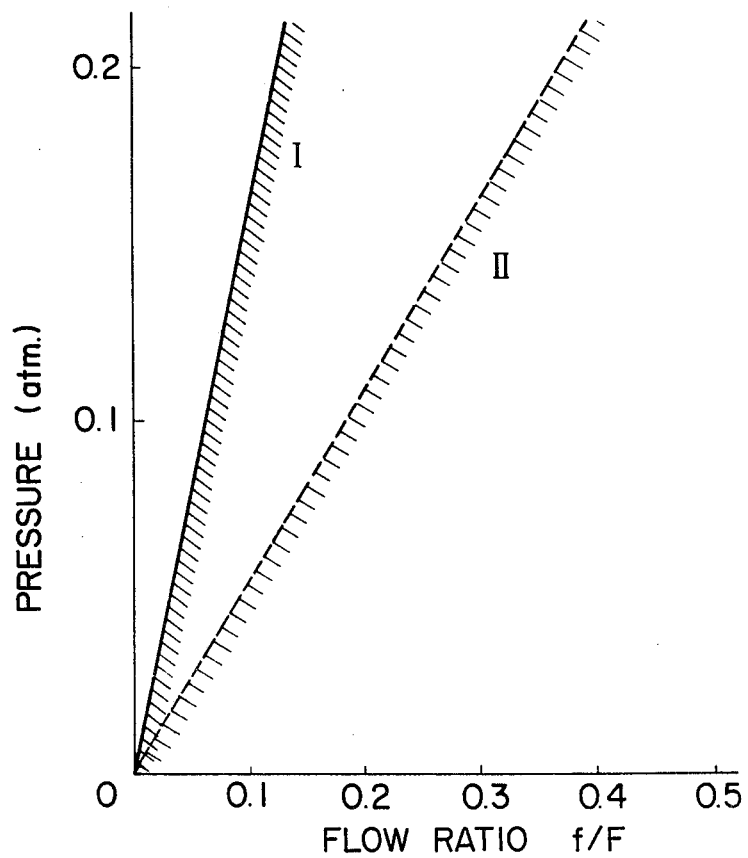
FIG. 6 shows ranges of desorption operation for krypton-85.

Now, computation of the condition for desorption in accordance with the above equations and the K value determined by the inventors will be explained in the following. FIG. 6 shows the range of desorption operation under one atmosphere at a temperature of −20°C (line I) and 20°C (line II). From the results shown in FIG. 6, it is understood that the lower the temperature of desorption, the wider the range of desorption operation, so that the desorption operation becomes simple. For example, in case of $f/F$ being 0.1, the value 0.16 or less of the desorption pressure is sufficient when the desorption temperature is −20°C, while at least 0.05 of the desorption pressure is necessary when the desorption is conducted under the same $f/F$ at 20°C. A preferable adsorption temperature range is −150° to 20°C, and a preferable desorption temperature is 20° to 200°C.

A switching time for repeating adsorption and desorption with respect to adsorption beds must be smaller than $t_b$ which is computed from the equation (6) and larger than $t_d$ which is computed from the equation (4). For example, when a quantity of activated carbon packed in each adsorption bed is 4.5 tons and 10 Nm³/h of an exhaust gas is subjected to adsorption under one atmosphere at a temperature of −°°C.

2-Nm³/h ($f/F = 0.2$) of a purified exhaust gas as a desorption gas is supplied to the activated carbon in the adsorption bed to be desorbed under 0.1 atmosphere at 20°C, and $t_b$ is 51 hours and $t_d$ is 18 hours, respectively. In this case, if the switching time interval is set up to 48 hours (2 days), the above requirements will be satisfied so that the operation of the system becomes possible.

As described above, by performing the adsorption and desorption of krypton-85 cyclically, krypton-85 adsorbed and desorbed remains in the system, whereby the concentration of krypton-85 in the gas gradually increases. The krypton-85 concentration $c$ increases proportionally with the number of cycles, and it can be computed from the following equation.

$$C = C_o \times \frac{F}{f} \times \frac{t_b}{t_d} \times n \quad (8)$$

wherein $C_o$ is the krypton-85 concentration in the exhaust gas to be treated, and n is the number of cycles of adsorption and desorption. When an exhaust gas containing 10 ppm of krypton-85 is treated 10 cycles under the conditions of 0.2 of $f/F$ and of $t_b/t_d$, the concentration of krypton-85 in the desorbed gas is increased to 10000 ppm (one volume %) as computed from the equation (8), that is, the concentration becomes 1000 times that of the original one. When the concentration exceeds several % by volume, the value $K$ becomes considerably small and the value $t_b$ expressed by the equation (6) becomes small. Accordingly the desorbed gas is charged in, such as, a delay tank or pressure vessel for storing the concentrated gas for a predetermined period of time. By this process described substantially 100% of krypton-85 can be separated and recovered from the exhaust gas at the concentrating rate of 1000.

If it is expected to further increase the concentration rate by the adsorption bed apparatus, there may occur such a disadvantage that the efficiency of the apparatus is lowered due to a decrease in adsorption capacity of the activated carbon. Though the quantity of a gas with a high krypton content is very small if the concentration is about one % by volume (when the concentration of krypton-85 is 10 ppm, the volume of the gas is one thousandth that of an initial volume), it is desired to develop a separating and recovering apparatus for krypton-85, which can further concentrate the desorbed gas, in view of the following points:

1. Reduction of load on a storing installation for a recovered krypton-85 gas
2. Utilization of krypton-85 (as a radioactive source or tracer)

From the above points of view, the present invention provides a new krypton-85 separating apparatus which comprises an adsorption bed system comprising a plurality of adsorption beds and a cryogenic distillation system. According to this combination, krypton-85 is completely and efficiently recovered by a continuous operation at a high concentration.

Figure 7:
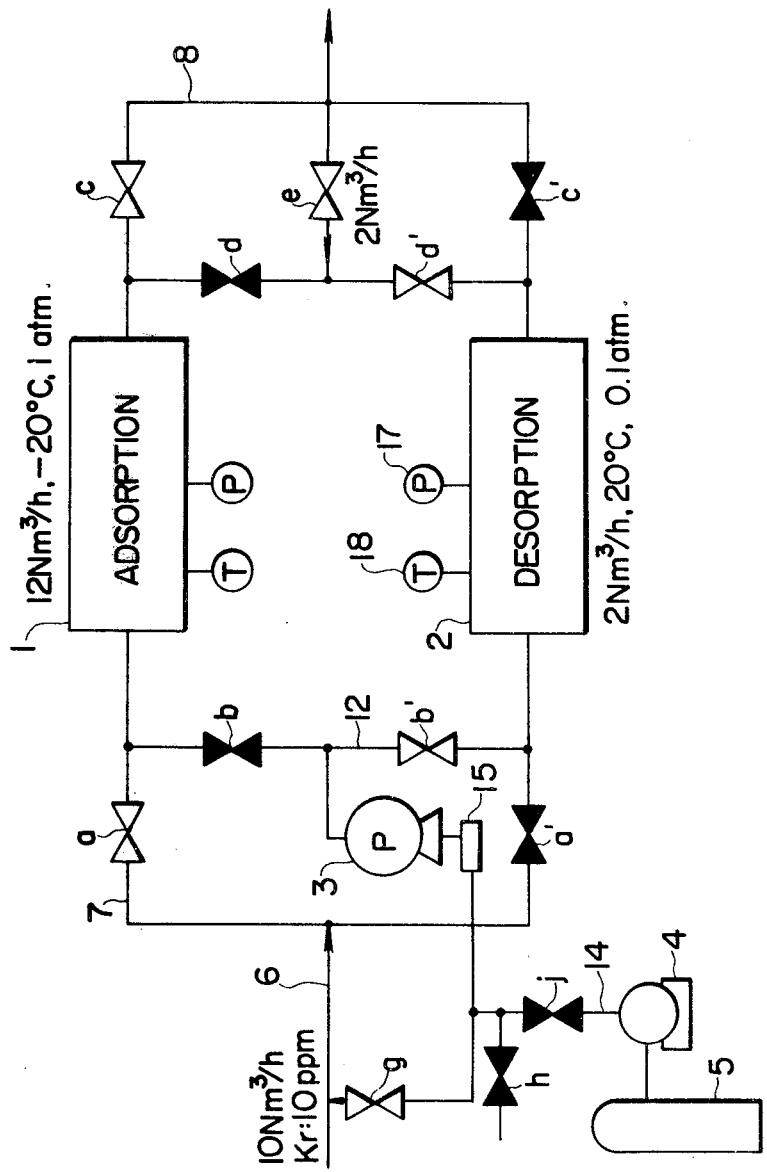
FIG. 7 is a schematic diagram of an apparatus embodying the present invention.

Referring to FIG. 7, which shows a cycle chart of a krypton-85 trapping apparatus according to the present invention, the apparatus can increase the concentration of krypton-85 to one % through a 100 cycle treatment with this apparatus of an exhaust gas of 10 Nm³/h containing 10 ppm of krypton-85. An exhaust gas containing radioactive noble gases is provided at a flow rate of 10 Nm³/h to a conduit 6 connected to a krypton-85 separating apparatus according to the present invention. The apparatus comprises a plurality of adsorption beds 1, 2 each being identical and packed with an activated carbon of 4.5 tons. At the inlets of the absorption beds is provided a gas conduit 7 having valves a, a' connected to the conduit 6. Conduits between respective valves a, a' and beds 1, 2 are provided with a conduit 12 having valves b, b' for desorption. The conduit 12 is connected to a vacuum pump 3.

A discharged conduit of a vacuum pump 3 is connected through a krypton-85 concentration meter 15 to a desorption introducing conduit 13 and a desorption gas drawing conduit 14 having a valve f. The desorption gas introducing conduit 13 is connected through a valve g to a gas introducing conduit 6. The desorption gas drawing conduit 14 is connected to a by-pass line having a valve h and a compressor 4 of which outlet is connected to a pressure vessel 5 for storing a concentrated krypton-85 gas. At the outlets of the adsorption beds 1, 2 is provided a purified gas discharge conduit 8 having valves c, c' connected to a purified gas outlet 9. Between the valves c, c' disposed to the purified gas conduit 8 and the adsorption beds 1, 2 is provided a desorption gas introducing conduits 11 connected to a desorption gas intake conduit 10 which is communicated through a valve e with the purified gas outlet 9.

FIG. 7 shows the condition of the apparatus in which adsorption bed 1 is subjected to adsorption of krypton-85 and adsorption bed 2 is subjected to desorption. An exhaust gas containing 10 ppm of krypton-85 supplied at a flow rate of 10 Nm$^3$/h through an exhaust gas introducing conduit 6 and mixed with a desorption gas discharged at a flow rate of 2 Nm$^3$/h from adsorption bed 2 is introduced into adsorption bed 1. The adsorption bed 1 is cooled by a suitable manner such as cryogenic apparatus (not shown) at a temperature of −20°C. The break through time of krypton-85 from the adsorption bed of this kind is, as determined in the above computation, 51 hours. A purified gas discharged from absorption bed 2 is discharged through a purified gas discharging conduit 8 and a purified gas outlet 9 into the atmosphere.

A desorption method of krypton-85 from an adsorption bed 2 will be described in the following. After the adsorption bed 2 is recovered by a heater (not shown) to the normal temperature (20°C), valve b' and h are opened first and a vacuum pump 3 is operated to reduce a pressure in the adsorption bed 2 to about 0.1 atm. The gas in the adsorption bed 2 is discharged through by-pass line 16, and then krypton-85 is detected in the outlet gas of the vacuum pump 3 by a krypton-85 concentration meter 15, thereafter the valve h is closed and valve g is opened. Valve e is opened to introduce the purified gas into the adsorption bed 2 at a flow rate of 2 Nm$^3$/h. The adsorption bed 2, when subjected to desorption, is operated at the normal temperature (20°C) under the reduced pressure (0.1 atm.) so as to effectively desorb krypton-85, whereby all krypton-85 is desorbed in 16 hours since desorption has been started, and the desorbed gas is introduced into the exhaust gas conduit 6 through the desorption gas introducing gas conduit 13 and then introduced again into the adsorption bed 1. After this operation, the adsorption bed 2 is cooled at a temperature of −20°C for the purpose of preparation for adsorption step.

At the time when adsorption of krypton-85 in the adsorption bed 1 has finished, adsorption operation is changed over the adsorption bed 2, and desorption operation is changed over the adsorption bed 1. A changing over time (cycle) may be determined by the break through time krypton-85 (51 hours) from the adsorption bed; the switching time interval can be determined in view of a safety of the apparatus in such a value as being smaller than the break through time, but larger than the desorption period (16 hours), i.e., 48 hours (2 days). According to the above mentioned operation, a krypton-85 concentration in the desorption gas is increased to one vol. %, which is a 1000 times the content of krypton-85 in the exhaust gas, after 100 cycles (200 days). When the krypton-85 concentration in the desorbed gas reaches a predetermined value, the valves g and f are opened and the compressor 4 is operated to pressurizingly charging the desorbed gas in the pressure vessel 5. Since an amount of desorbed gas is 48 Nm$^3$, a pressure vessel 5 of 480 liters can contain the gas when pressurized at 100 atm.

Though in the above described embodiment adsorption operation in the adsorption bed 1 is carried out at a low temperature of −20°C so as to prolong the cycle time, the adsorption operation can be performed even at the normal temperature without a substantial damage to adsorption of krypton-85. In this case the break through time is small, but there is such an advantage that cooling and warming steps of adsorption beds can be omitted. For example, when adsorption is carried out at a temperature of 20°c using adsorption beds each having the same size and the same capacity as in case of the previously mentioned embodiment, the break through time of krypton-85 is 17 hours, and when a desorption pressure is 0.05 atm. and a cycle time is determined at 15 hours, a safe operation is expected.

According to the above embodiment of the present invention, the following advantages are obtained:

1. 100% recovery of Kr$^{85}$ in an exhaust gas; by determining the suitable adsorption-desorption cycle time, which is smaller than the break through time of Kr$^{85}$ from adsorption beds, leakage of Kr$^{85}$ from the separating apparatus can be prevented completely.

2. Continuous treatment of an exhaust gas is provided, while the treatment in the conventional apparatus was performed in a batch.

3. Optional selection of a Kr$^{85}$ concentration in a desorbed gas; since the concentration is proportional to the number of cyclic operations, the concentration corresponding to the number of the predetermined operation cycles is obtained.

4. Reliable safety; since the closed cycle system is employed in the embodiment, there is no leakage of Kr$^{85}$ into the atmosphere.

5. Optional choice of operating conditions is obtained.

6. Ease of maintenance and economy of apparatus; since few moveable parts are used in the apparatus, operation and maintenance are simplified, and the apparatus is more economical than the conventional ones.

7. No need of pretreatment of an exhaust gas; since adsorbing activity of an activated carbon is deteriorated by impurities particularly water adsorbed, it was necessary to preheat the exhaust gas in the conventional methods so as to remove the impurity. However, there is no necessity to pretreat the gas in the present invention because a purified gas drawn from an outlet of an adsorption bed is used as a desorption gas. Therefore, a dryer, etc. are not necessary.

Though the krypton-85 concentration can be increased up to one volume % by the apparatus described above, there will be a disadvantage such that if it is expected to further increase the concentration, the efficiency of the apparatus is lowered by a decrease in an adsorption property of an activated carbon. When the concentration is increased to one volume %, the amount of recovered gas is made considerably small; however, it is expected in some cases to further increase the concentration. In order to satisfy the above requirement, another embodiment of the present invention combines the apparatus described above and a cryogenic distillation system. The adsorption system and distillation system have such advantages and disadvantages, respectively, as set forth in the following.

means that it is very difficult to separate such a small amount of krypton-85 from the gas with the cryogenic distillation system in view of its separating characteristics. In one embodiment of the present invention, the gas discharged from the cryogenic distillation system and containing a small quantity of krypton-85 is admixed with an exhaust gas and recycled by a blower 59 to the adsorption beds through a valve 82, a recycling conduit 62 and the blower 59.

Liquified nitrogen for liquifying argon gas is supplied through a liquified nitrogen conduit 60 and a valve 88 to a liquified nitrogen tank 58. Nitrogen evaporated in the liquifying apparatus 54 is compressed by a com-

|  | | Adsorption bed system | Cryogenic distillation system |
|---|---|---|---|
| Advantages: | 1) | Complete recovery of $Kr^{85}$ | 1) Large concentration ratio of $Kr^{85}$ |
|  | 2) | Continuous operation | |
| Disadvantage: | 1) | Small upper limit to a concentration ratio of $Kr^{85}$ | 1) Small recovery ratio at a low $Kr^{85}$ concentration |

The embodiment described hereinafter utilizes the above-mentioned advantages of the respective systems.

Figure 8:
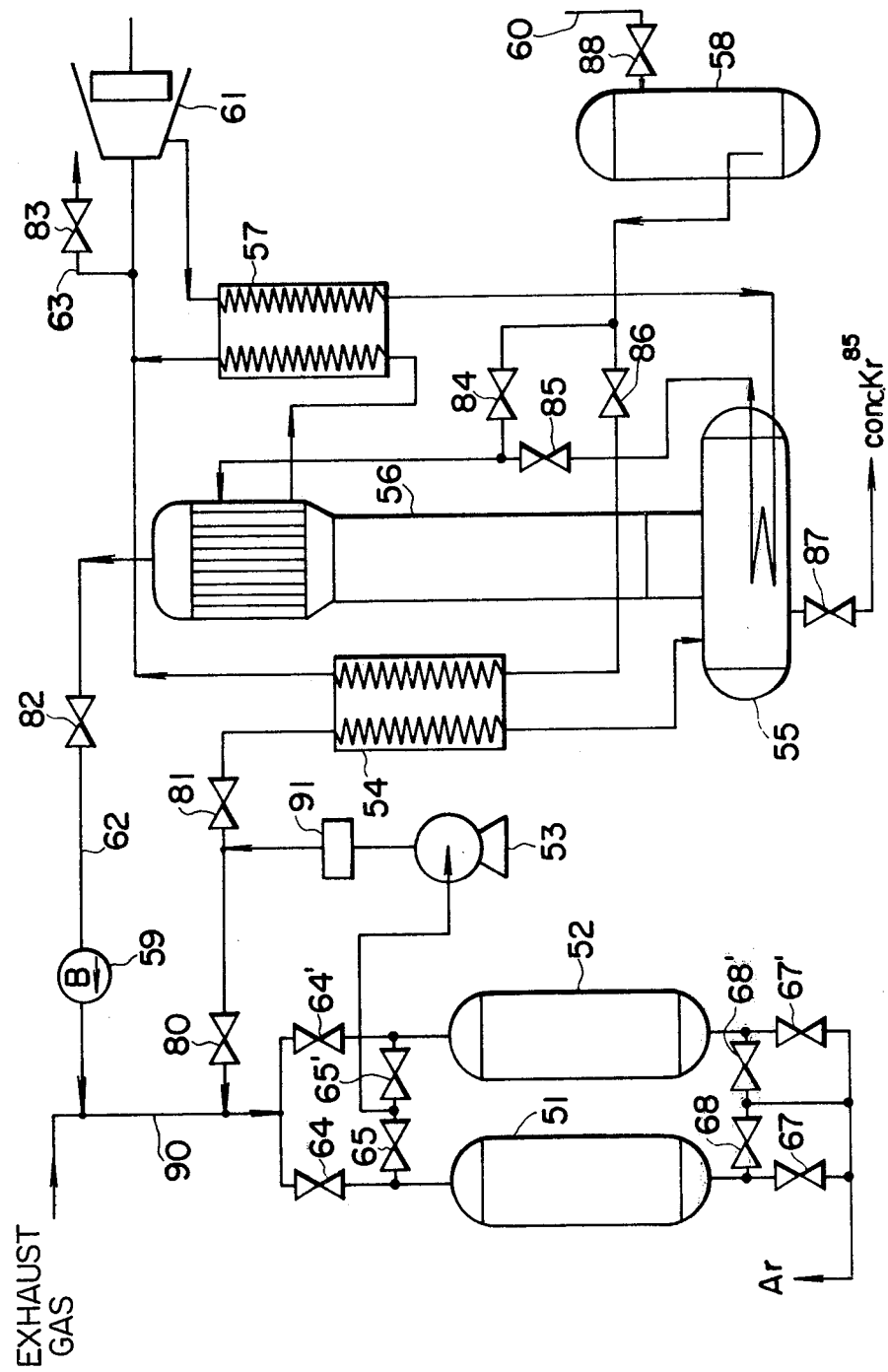
FIG. 8 is another diagram of an apparatus according to the present invention.

In FIG. 8, there is shown a diagram of a separating and recovering apparatus which is used for recovering $Kr^{85}$ from a cover gas such as argon of FBR. In this embodiment argon gas containing 10 ppm of krypton-85 is treated at a flow rate of 1 $Nm^3/h$ so that 2 $Nm^3$/year of argon gas containing 5 volume % of krypton-85 is obtained. Adsorption beds 51, 52 each being provided with heating and cooling means are each packed with 12 tons of activated carbon, and are alternately subjected to adsorption and desorption at a predetermined time interval so as to separate krypton-85 in the cover gas. A vacuum pump 53 is operated to reduce the pressure in an adsorption bed to be desorbed, while adsorbing krypton-85 in another bed. A desorbed gas is introduced through a valve 80 into an exhaust gas conduit 90 and admixed with the exhaust gas untreated, as shown in FIG. 8. Adsorption of krypton-85 is carried out at a temperature of −20°C under 1 atm. for 400 hours, and desorption is carried out at a temperature of 20°C in 10 torr. at a flow rate of 0.5 $Nm^3/h$ for 240 hours. According to these conditions, changing-over time (cycle) for adsorption beds is set up to 400 hours. The operation of the adsorption system is performed by adequately operating valves 64, 64', 65, 65', 67, 67', 68, 68' at a certain time interval, as can be understood from the foregoing description with respect to the apparatus shown in FIG. 7. After the exhaust gas is treated in the adsorption beds for 20 cycles (about 1 year), and a krypton-85 concentration becomes a predetermined value, which is determined by a meter 91, the krypton-85 concentration is increased up to about 0.1 volume %. 120 $Nm^3$ of the thus concentrated argon gas is introduced into a cryogenic distillation system wherein krypton-85 and argon gases are liquified in a liquification tower 54 by liquififed nitrogen provided from a liquified nitrogen tank 58 through a through valve 81. The argon gas is vaporized in evaporator 55 to increase the concentration of krypton-85 of the desorbed gas produced in the adsorption bed system. Krypton-85 cannot be completely separated and the gas flowing out the cryogenic distillation system contains about 10 ppm of krypton-85, if the desorbed gas is treated only once with the distillation system. The concentration of krypton-85 is 10 ppm and this fact pressor 61 at a pressure of about 30 $kg/cm^2$ and charged in the evaporated state to be introduced through a valve 85 into the top portion of a distillation column 56. At the top portion, a part of krypton-85 gas contained in argon gas evaporated in the evaporator 55 is liquified to be separated from argon gas. Nitrogen gas discharged from the top portion of the separating or distillation column 56 is cycled by the compressor 61 through the heat exchanger 57, together with nitrogen gas evaporated in a liquifying apparatus 54. An excess part of nitrogen gas in the distillation system is purged into the line 63 having a valve 83.

According to the above described apparatus, a concentrated exhaust gas containing 0.1 volume % of krypton-85 supplied from the adsorption bed system at a flow rate of 120 $Nm^3$/year can be concentrated up to 5 volume % by 50 days operation. A recovered gas rich in krypton-85 is taken out from the bottom of the evaporator 55 and about 2 $Nm^3$ of the recovered gas is charged through a valve 87 in a delay tank (not shown).

According to combination of adsorption bed system and distillation system, separation and recovery of krypton-85 from an exhaust gas of a nuclear reactor, fuel reprocessing facilitate, or the like can be performed with the following advantages.

1. Complete recovery of $Kr^{85}$; the recovery ratio is a conventional cryogenic distillation apparatus is small so that about 10 ppm of krypton-85 is present in the gas discharged from the cryogenic distillation apparatus. However, there is no leakage of krypton-85 out of the system of the present invention because the discharged gas is treated again with the adsorption bed system.

2. Large concentration ratio of $Kr^{85}$; it is rather difficult to increase the concentration of krypton-85 to 1 volume % or more, but the concentration can be increased to about 5 volume % or more by combining the distillation system with the adsorption system.

3. There is small probability of troubles in the apparatus and control system therefor.

When the adsorption beds only are employed, the operation number has to be pretty large in order to increase the krypton-85 concentration (for example, one volume % of $Kr^{85}$ concentration is attained by 200 to 300 cycles.). According to combination of the cryogenic distillation system with the adsorption bed system, there is no necessity to increase the concentration up to 1 volume % in the adsorption beds, i.e., as shown in the above example, 0.1 volume % is enough to be cycled in the cryogenic distillation system, so that the operation number of the adsorption bed system is 20 to 30 cycles, which is one tenth that of the former case. Therefore, the troubles in the apparatus and control means therefor will be decreased because the operation number of the adsorption bed system is remarkably small. In addition, the maintenance is simplified and an operation cost of the cryogenic distillation apparatus is saved because the operation number is also small. As set forth in the above example, the operation time of the cryogenic distillation system is only about 50 days in a year.

4. Small volume of recovered gas and small capacity of a storing facilitate for the recovered gas are needed.

In view of adsorption efficiency of activated carbon, the adsorption temperature should be lower than the normal temperature. That is, a suitable temperature range for adsorption is −150° to 20°C, but a range of −50°C to 10°C is preferably employed in the light of cooling economy of the adsorption bed system and of adsorption efficiency. On the other hand, desorption is carried out at a temperature higher than the normal temperature. A suitable range therefor is 20° to 200°C. A temperature higher than 200°C is not employed so as to avoid combustion of activated carbon in the adsorption bed. A temperature range of 20° to 100°C is preferably employed for desorption. The smaller the pressure in an adsorption bed being subjected to desorption, the higher the efficiency of desorption. The preferable relationship between the pressure in the adsorption bed and other different conditions with respect to the adsorption bed system is set forth by the equation (7).

In case of the apparatus employing the adsorption bed system and the cryogenic distillation system, about 0.05 – 1% by volume of the krypton-85 concentration is preferable for storing, in view of operating efficiency of apparatus.

While the novel embodiments of the invention have been described, it will be understood that various omissions, modifications and changes in these principles may be made by one skilled in the art without departing from the spirit and scope of the invention.

What we claim is:

1. A process for increasing the concentration of krypton-85 in an exhaust gas containing krypton-85 comprising passing a mixture of desorbed krypton-85 obtained from a first adsorption bed and said exhaust gas into a second adsorption bed arranged in parallel with respect to said first adsorption bed until substantially all of the krypton-85 adsorbed in said first adsorption bed is transferred to said second adsorption bed, and thereafter transferring a mixture of said exhaust gas and the krypton-85 adsorbed in said second adsorption bed to said first adsorption bed until substantially all of the krypton-85 adsorbed in said second adsorption bed has been transferred to said first adsorption bed.

2. The process according to claim 1, wherein desorption of each of the adsorbent beds is accomplished simultaneously with adsorption in the other bed, adsorption in each bed being terminated prior to the krypton-85 breakthrough time of the bed being adsorbed, each bed being alternately subjected to adsorption and desorption until the concentration of krypton-85 in the gas passing out of one of the beds being desorbed reaches a predetermined level, said process further comprising discharging the gas having a krypton-85 concentration of a predetermined level.

3. The process according to claim 2, wherein the gas containing krypton-85 at the predetermined level is discharged into a storing vessel.

4. A process for increasing the concentration of krypton-85 in an exhaust gas containing krypton-85 comprising:
   1. establishing a krypton-85 flow path including a first adsorption bed packed with an adsorbent for krypton-85 and a second adsorption bed packed with an adsorbent for krypton-85.
   2. repeatedly transferring krypton-85 back and forth between the first bed and the second bed in said flow path by adsorbing krypton-85 in one of said adsorption beds while simultaneously desorbing krypton-85 from the other adsorption bed and thereafter desorbing krypton-85 from said one adsorption bed and adsorbing kryton-85 on said other adsorption bed,
   3. passing said exhaust gas containing krypton-85 into said flow path intermediate said first and second beds whereby substantially all of the krypton-85 in said exhaust gas is retained in said krypton-85 flow path while substantially all of the remainder of said exhaust gas is discharged through said first and second adsorption beds, and
   4. withdrawing the gas in said krypton-85 flow path when the concentration of the krypton-85 and the gas therein reaches a predetermined value.

5. The process according to claim 4, wherein the adsorbent beds are packed with activated carbon.

6. The process according to claim 4, wherein a portion of the gas passing out of each adsorption bed and substantially free of krypton-85 is fed to the other adsorption bed during desorption of said other adsorption bed.

7. The process of claim 4, wherein the concentration of krypton-85 is increased from on the order of 1 ppm in said exhaust gas to at least about 0.1% by volume in said desorbed gas before said desorbed gas is withdrawn.

8. The process of claim 4, wherein the krypton-85 concentration ratio of the desorbed gas to the exhaust gas is on the order of 10,000.

9. A process for separating and recovering krypton-85 contained in an exhaust gas flowing from a nuclear facility into a separating and concentrating apparatus having an inlet passage for receiving the exhaust gas, said process comprising:
   desorbing krypton-85 adsorbed on activated carbon packed in a first adsorption bed to obtain a desorbed gas having an increased krypton-85 concentration, communication between said first adsorption bed and said inlet passage being stopped during desorption of said first adsorption bed;
   introducing exhaust gas together with all of the desorbed gas produced during desorption of said first adsorption bed into a second adsorption bed packed with activated carbon, said second adsorption bed communicating with said inlet passaage during the adsorption step in said second adsorption bed, the desorption and adsorption steps in each of the adsorption beds being alternately repeated at a predetermined time interval smaller than the krypton-85 breakthrough time with respect to the activated carbon packed in each of the adsorption beds, said desorption and adsorption steps being alternately repeated without allowing the desorbed gas to flow out of the closed loop formed by the first and second adsorption beds and until the concentration of the krypton-85 in the desorbed gas reaches a predetermined value; and charging the desorbed gas having the predetermined krypton-85 concentration to a storing tank under pressure.

10. A process according to claim 9, wherein the adsorption bed being supplied with the exhaust gas is kept at a first temperature lower than the normal temperature and the other adsorption bed being subjected to desorption is kept at a second temperature higher than the normal temperature.

11. A process according to claim 10, wherein the first temperature is of −150°C. to 20°C. and the second temperature is of 20°C. to 200°C.

12. A process according to claim 9, wherein desorption of krypton-85 is carried out by reducing a pressure in the adsorption bed.

13. The process according to claim 9, wherein desorption is accomplished by elevating the temperature or reducing the pressure in the adsorption bed being desorbed.

14. The process according to claim 9, wherein a part of the purified exhaust gas drawn from one of the adsorption beds during adsorption is supplied to the other adsorption bed during the desorption of said other adsorption bed so as to desorb krypton-85 adsorbed on the activated carbon in said other adsorption bed.

15. A process for separating and recovering krypton-85 contained in an exhaust gas flowing from a nuclear facility into a separating and concentrating apparatus having an inlet passage for receiving the exhaust gas, said process comprising:

desorbing krypton-85 absorbed on activated carbon packed in a first adsorption bed to obtain a desorbed gas comprising a carrier gas and krypton-85, said desorbed gas having an increased krypton-85 concentration, communication between said first adsorption bed and said inlet passage being stopped during desorption of said first adsorption bed;

introducing exhaust gas together with all of the desorbed gas produced during desorption of said first adsorption bed into a second adsorption bed packed with activated carbon, said second adsorption bed communicating with said inlet passage during the adsorption step in said second adsorption bed, the desorption and adsorption steps in each of the adsorption beds being alternately repeated at a predetermined time interval smaller than the krypton-85 breakthrough time with respect to the activated carbon packed in each of the adsorption beds, said desorption and adsorption steps being alternately repeated without allowing the desorbed gas to flow out of the closed loop formed by the first and second adsorption beds and until the concentration of the krypton-85 in the desorbed gas reaches a first predetermined value;

introducing the desorbed gas containing krypton-85 of said first predetermined value into a cryogenic distillation apparatus wherein the desorbed gas is liquified by heat exchange between the desorbed gas and a cooling mediium not in contact with the desorbed gas;

selectively evaporating the carrier gas from the liquified desorbed gas thereby increasing the krypton-85 concentration in the liquified gas to a second predetermined value; and recycling the carrier gas accompanied by a small amount of krypton-85 evaporated from the cryogenic apparatus to the closed loop in oorder to further repeat adsorption and desorption of the krypton-85 in said adsorption beds.

16. A process according to claim 15, wherein the adsorption bed being supplied with the exhaust gas is kept at first temperature lower than the normal temperature and the another adsorption bed being subjected to desorption is kept at a second temperature higher than the normal temperature.

17. A process according to claim 6, wherein the first temperature is of −150°C. to 20°C. and the second temperature is of 20°C. to 200°C.

18. A process according to claim 15, wherein desorption of krypton-85 is carried out by reducing a pressure in the adsorption bed.

19. A process according to claim 15, wherein the krypton-85 concentration in the concentrated gas is about 3 to 7 % by volume.

20. The process according to claim 15, further comprising charging the gas having a krypton-85 concentration of the second predetermined value into a storing tank under pressure.

21. The process according to claim 15, wherein desorption is accomplished by elevating the temperature or reducing the pressure of the adsorption bed being desorbed.

22. The process according to claim 15, wherein a part of the purified exhaust gas drawn from one of the adsorption beds during adsorption is supplied to the other adsorption bed during the desorption of said other adsorption bed so as to desorb krypton-85 adsorbed on the activated carbon in said other adsorption bed.

23. The process of claim 22, wherein the desorption and adsorption steps in each of the adsorption beds are alternately repeated until the krypton-85 concentration ratio of the desorbed gas to the exhaust gas is on the order of 1000.

24. A process for treating an exhaust gas from a nuclear facility to separate and concentrate krypton-85 comprising passing exhaust gas into a first adsorption bed packed with an adsorbent for krypton-85 to adsorb krypton-85 on said adsorbent, stopping the flow of exhaust gas to said first adsorption bed prior to the krypton-85 breakthrough time of the first adsorption bed, passing exhaust gas to a second adsorption bed packed with an adsorbent for krypton-85 to adsorb krypton-85 on said adsorbent, said second adsorption bed being in parallel with said first adsorption bed with respect to the incoming exhaust gas, desorbing the krypton-85 in said first adsorption bed, admixing the desorbed krypton-85 desorbed from said first adsorption bed with the incoming exhaust gas fed to said second adsorption bed, desorption of said first adsorption bed being accomplished in such a way that substantially complete desorption of the adsorbed krypton-85 occurs before the krypton-85 breakthrough time of the second adsorption bed, stopping the flow of exhaust gas to said second adsorption bed after substantially all of the krypton-85 desorbed from said first adsorption bed has been passed to said second adsorption bed and prior to the krypton-85 breakthrough time of said second adsorption bed, said second adsorption bed being desorbed under such conditions that substantially all of the krypton-85 contained therein is desorbed prior to the krypton-85 breakthrough time of said first adsorption bed, and mixing the krypton-85 desorbed from said second adsorption bed with the incoming exhaust gas passing to said first adsorption bed.

25. The process according to claim 24, wherein the adsorbent in each adsorbent bed is activated carbon.

26. The process according to claim 24, wherein said first and said second adsorption beds are arranged in parallel with respect to an exhaust gas inlet for receiving exhaust gas to be treated and with respect to a purified gas outlet for discharging purified gas substantially free of krypton-85, said process further comprising passing purified gas produced during adsorption in said first adsorption bed out of said inlet and passing purified gas produced in said second adsorption bed during adsorption in said second adsorption bed being passed out of said outlet.

27. The process according to claim 26, wherein a portion of the purified gas passing out of one of the adsorption beds during adsorption in said one adsorption bed is fed to the other adsorption bed during desorption of said other adsorption bed.

28. The process according to claim 26, further including withdrawing all of the desorbed gas passing out of one of said beds during desorption when the concentration of krypton-85 in said desorbed gas reaches a predetermined value.

* * * * *